US012742517B2

(12) United States Patent
Jung et al.

(10) Patent No.: US 12,742,517 B2
(45) Date of Patent: Sep. 22, 2026

(54) CRYOGENIC CONTAINER FOR A VEHICLE AND A METHOD OF MANUFACTURING AN OUTER CONTAINER OF THE CRYOGENIC CONTAINER

(71) Applicants: HYUNDAI MOTOR COMPANY, Seoul (KR); KIA CORPORATION, Seoul (KR)

(72) Inventors: Se Kwon Jung, Seoul (KR); Jun Sung Ahn, Yongin-si (KR); Sang Moo Han, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 627 days.

(21) Appl. No.: 18/135,774

(22) Filed: Apr. 18, 2023

(65) Prior Publication Data

US 2023/0358363 A1 Nov. 9, 2023

(30) Foreign Application Priority Data

May 9, 2022 (KR) ........................ 10-2022-0056727

(51) Int. Cl.
*F17C 1/14* (2006.01)

(52) U.S. Cl.
CPC ........ *F17C 1/14* (2013.01); *F17C 2201/0109* (2013.01); *F17C 2203/013* (2013.01); *F17C 2203/0391* (2013.01); *F17C 2203/0631* (2013.01); *F17C 2203/0643* (2013.01); *F17C 2203/0646* (2013.01); *F17C 2203/0648* (2013.01); *F17C 2209/22* (2013.01); *F17C 2221/012* (2013.01); *F17C 2223/0161* (2013.01); *F17C 2270/0178* (2013.01); *F17C 2270/0184* (2013.01)

(58) Field of Classification Search
CPC ...... F17C 1/02; F17C 1/08; F17C 1/14; F17C 2201/0109; F17C 2201/12; F17C 2203/013; F17C 2203/0391; F17C 2203/012; F17C 2203/014; F17C 2203/0304; F17C 2203/358; B65D 7/22; B65D 25/18; B65D 90/028
USPC ...................................................... 220/592.05
See application file for complete search history.

(56) References Cited

U.S. PATENT DOCUMENTS 4,287,720 A * 9/1981 Barthel .................. F25B 21/02
62/45.1
6,708,502 B1 3/2004 Aceves et al.
(Continued)

FOREIGN PATENT DOCUMENTS

| | | | |
|---|---|---|---|
| JP | 3456044 | B2 | 8/2003 |
| JP | 4815129 | B2 | 9/2011 |
| KR | 101419821 | B1 | 7/2014 |

*Primary Examiner* — Andrew T Kirsch
(74) *Attorney, Agent, or Firm* — Lempia Summerfield Katz LLC

(57) ABSTRACT

A cryogenic container for a vehicle for storing a fluid includes an inner container having an inner space for storing the fluid, an outer container disposed to surround the inner container and having a heat insulation space configured to suppress heat transfer to the inner container, the heat insulation space being formed between the inner container and the outer container, and a reinforcement part configured to support the outer container in the heat insulation space to reinforce the outer container.

13 Claims, 9 Drawing Sheets

(56) References Cited

U.S. PATENT DOCUMENTS

| | | | | |
|---|---|---|---|---|
| 2002/0179684 | A1* | 12/2002 | Jaidka | F17C 1/02 228/184 |
| 2004/0060304 | A1 | 4/2004 | Aceves et al. | |
| 2009/0200319 | A1* | 8/2009 | Vinjamuri | F17C 13/06 220/589 |
| 2018/0163925 | A1* | 6/2018 | Inoh | B32B 27/38 |
| 2018/0224064 | A1* | 8/2018 | Aceves | F17C 3/08 |
| 2018/0266627 | A1* | 9/2018 | Ogiwara | F17C 1/02 |

* cited by examiner

CRYOGENIC CONTAINER FOR A VEHICLE AND A METHOD OF MANUFACTURING AN OUTER CONTAINER OF THE CRYOGENIC CONTAINER

CROSS-REFERENCE TO RELATED APPLICATION

This application claims the benefit of and priority to Korean Patent Application No. 10-2022-0056727, filed in the Korean Intellectual Property Office on May 9, 2022, the entire contents of which are incorporated herein by reference.

TECHNICAL FIELD

The present disclosure relates to a cryogenic container for a vehicle and a method of manufacturing an outer container of a cryogenic container for a vehicle.

BACKGROUND

The statements in this section merely provide background information related to the present disclosure and may not constitute prior art.

In hydrogen fuel cell vehicles, TYPE 4 pressure containers are generally used to store hydrogen. The TYPE 4 pressure containers are containers formed by winding carbon fiber composite materials around non-metallic liners. However, in recent years, research on application of cryogenic containers to the hydrogen fuel cell vehicles is actively being conducted. The cryogenic containers refer to containers that may be generally used to store fluids (e.g., liquefied gases) at a temperature of −50° C. or lower. However, since vehicles and other mobility devices are frequently exposed to high levels of vibration, impact, and acceleration, it is very important to increase strengths of the cryogenic containers in order to make the cryogenic containers suitable for use in these applications. Further, when considering efficiency of the vehicles and other mobility devices, reducing weight of the cryogenic containers may also be very important. However, increasing the thicknesses of the containers to improve their strength also increases their weight, making the high strength and the weight reduction incompatible.

SUMMARY

The present disclosure has been made to solve the above-mentioned problems occurring in the prior art while advantages achieved by the prior art are maintained intact.

An aspect of the present disclosure provides a cryogenic container for a vehicle and a method of manufacturing an outer container of a cryogenic container for a vehicle, which may achieve both high strength and weight reduction of the container to apply the cryogenic container to mobility devices such as vehicles.

Further, another aspect of the present disclosure provides a cryogenic container for a vehicle and a method of manufacturing an outer container of a cryogenic container for a vehicle, which may achieve high strength and weight reduction of the outer container of the cryogenic container for a vehicle.

Furthermore, still another aspect of the present disclosure provides a cryogenic container for a vehicle and a method of manufacturing an outer container of a cryogenic container for a vehicle, which may achieve high strength and weight reduction of the cryogenic container for a vehicle without increasing a manufacturing cost (or at a relatively low cost).

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a cryogenic container for a vehicle for storing a fluid is provided. The cryogenic container includes: an inner container having an inner space for storing the fluid, and an outer container disposed to surround the inner container and having a heat insulation space that suppresses heat transfer to the inner container. In particular, the heat insulation space is formed between the inner container and the outer container. The cryogenic container further includes a reinforcement part that supports the outer container in the heat insulation space to reinforce the outer container.

In another embodiment, the reinforcement part may include a reinforcement body having an annular cross section corresponding to an inner circumferential surface of the outer container and disposed in the heat insulation space to be in contact with the inner circumferential surface of the outer container.

In still another embodiment, the reinforcement part may further include a plurality of through-holes passing through the reinforcement body and arranged in a circumferential direction of the reinforcement body.

In yet another embodiment, the reinforcement body may not be physically combined to the inner circumferential surface of the outer container.

In yet another embodiment, the reinforcement body may include a support member having an annular cross section and inscribed on the inner circumferential surface of the outer container to support the inner circumferential surface of the outer container. The reinforcement body may further include a plurality of body units having a plurality of leg members extending from the support member in a direction corresponding to a direction of a central axis of the support member and arranged spaced apart from each other in a circumferential direction of the support member.

In yet another embodiment, the body units may be arranged such that the support member of one of two adjacent body units and the leg members of the other one thereof are in contact with each other.

In yet another embodiment, each of the body units further may include a cutting line that cuts the support member in a direction corresponding to the direction of the central axis or a suture line that sutures the cutting line. The body units may be arranged such that the cutting line or suture line of one of two adjacent body units is not positioned on a straight line with the cutting line or suture line of the other one thereof.

In yet another embodiment, the reinforcement body may be formed in a unitary one-piece structure distinguished from the outer container.

In yet another embodiment, the reinforcement body may include a plurality of support rings inscribed on the inner circumferential surface of the outer container and a plurality of connection strings that are arranged between two adjacent support rings and connect the two adjacent support rings.

In yet another embodiment, the connection strings may repeatedly connect the two adjacent support rings in a circumferential direction of the support rings in a manner in which one point of a plurality of points on one support ring of the two adjacent support rings and one point of a plurality of points on the other one support ring of the two adjacent support rings are connected, and then the one point on the other one support ring is connected to another one point on the one support ring.

In yet another embodiment, each of the connection strings may be disposed between the two adjacent support rings while being elastically compressed by the two adjacent support rings.

In yet another embodiment, the outer container may include a cylinder portion having an annular cross section and extending in a predetermined longitudinal direction perpendicular to the annular cross section. The outer container may further include a head portion that covers an opening of the cylinder portion, and the head portion may be formed to be thicker than the cylinder portion and have an inner circumferential surface protruding from a coupling position between the head portion and the cylinder portion further toward the heat insulation space than an inner circumferential surface of the cylinder portion.

In yet another embodiment, the reinforcement part may be supported by a side surface of the head portion exposed to the heat insulation space and fixed to the heat insulation space due to a thickness difference between the head portion and the cylinder portion at the coupling position.

In yet another embodiment, the outer container may be formed of at least one of SUS 300 series stainless steel, 1000 series aluminum, and 6000 series aluminum.

In yet another embodiment, the reinforcement part may be formed of at least one of steel, spring steel, titanium, titanium alloy, 2000 series aluminum, or 7000 series aluminum.

According to another aspect of the present disclosure, there is provided a method of manufacturing an outer container of a cryogenic container for a vehicle for manufacturing an outer container disposed to surround an inner container storing a fluid. The method includes: operation (a) preparing a cylinder portion having an opening at at least one end, operation (b) inserting a reinforcement part that reinforces the cylinder portion into an inner space of the cylinder portion through the opening, and operation (c) coupling a head portion that covers the opening to one end of the cylinder portion. In particular, the reinforcement part is disposed in the inner space of the cylinder portion while in contact with an inner circumferential surface of the cylinder portion.

In yet another embodiment, the method may include, between operations (b) and (c), joining the cylinder portion along a line cutting the cylinder portion in a longitudinal direction of the cylinder portion.

In yet another embodiment, the head portion may be formed to be thicker than the cylinder portion and have an inner circumferential surface protruding from a coupling position between the head portion and the cylinder portion further toward the inner space than the inner circumferential surface of the cylinder portion. In operation (c), the reinforcement part may be pressed by a side surface of the head portion exposed to the inner space and fixed to the inner space due to a thickness difference between the head portion and the cylinder portion at the coupling position when the head portion is combined to the cylinder portion.

In yet another embodiment, the reinforcement part may include a support member that has an annular cross section and supports the inner circumferential surface of the cylinder portion, and a plurality of body units having a plurality of leg members extending from the support member in a direction corresponding to a longitudinal direction of the cylinder portion and arranged spaced apart from each other in a circumferential direction of the support member. The operation (b) may include sequentially inserting the body units into the inner space of the cylinder.

In yet another embodiment, each of the body units may be manufactured through processing a flat plate-like material to form a first portion extending in a predetermined direction and a plurality of second portions extending from the first portion in a direction perpendicular to the predetermined direction and arranged spaced apart from each other in the predetermined direction, and joining adjacent distal ends of the first portion after rolling the first portion into an annular shape.

BRIEF DESCRIPTION OF THE DRAWINGS

The above and other objects, features and advantages of the present disclosure should be more apparent from the following detailed description taken in conjunction with the accompanying drawings.

Figure 1:
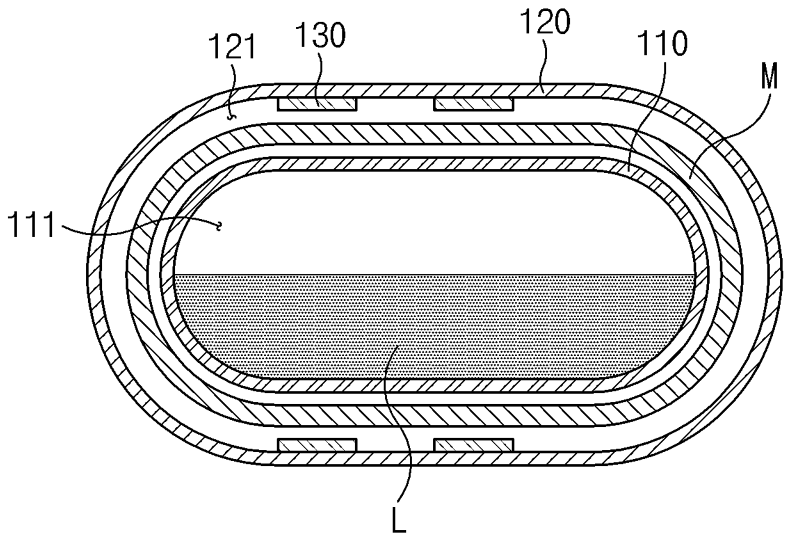
FIG. 1 is a conceptual cross-sectional view illustrating a cryogenic container for a vehicle according to an embodiment of the present disclosure.

The drawings described herein are for illustration purposes only and are not intended to limit the scope of the present disclosure in any way.

DETAILED DESCRIPTION

Hereinafter, some embodiments of the present disclosure are described in detail with reference to the exemplary drawings. When components in the drawings are designated by reference numerals, the same components have the same reference numerals as far as possible even though the components are illustrated in different drawings. Further, in description of the embodiments of the present disclosure, when it is determined that a detailed description of a related well-known configuration or function disturbs understanding of the embodiments of the present disclosure, the detailed description has been omitted.

When a component, device, element, or the like of the present disclosure is described as having a purpose or performing an operation, function, or the like, the component, device, or element should be considered herein as being "configured to" meet that purpose or to perform that operation or function.

Structure of Cryogenic Container

FIG. 1 is a conceptual cross-sectional view illustrating a cryogenic container for a vehicle according to an embodiment of the present disclosure. The cryogenic container for a vehicle according to the embodiment of the present disclosure, which is adapted to store a fluid "L", may include an inner container 110 and an outer container 120 as illustrated in FIG. 1.

As an example, the above-described fluid may include at least one of a gas, a liquid, or any combination thereof. Furthermore, the above-described fluid may be a liquefied gas. As a detailed example, the above-described fluid may include at least one of hydrogen in a gaseous state, hydrogen in a liquid state, or any combination thereof. The fluid may be liquefied hydrogen that is hydrogen in a liquid state. In a more detailed example, the fluid may be liquefied hydrogen, in which at least a portion of the hydrogen in the gaseous state is liquefied, and hydrogen in the gaseous state that is a gaseous state, in which the hydrogen is not liquefied, or may be liquefied hydrogen that is liquefied in a state, in which the entire hydrogen in the gaseous state is in a cryogenic state such as cryo-compressed hydrogen. In other words, the fluid may be understood as a concept including the hydrogen in the liquid state and the hydrogen in the gaseous state or a concept including only the hydrogen in the liquid state. However, the contents merely correspond to an example, and a kind of the fluid according to the present disclosure is not limited only to hydrogen, and may be understood as a concept including an arbitrary material in a cryogenic state.

The inner container 110 may be a container having an inner space 111 for storing the fluid "L". A cryogenic liquid may be stored in the inner space 111 of the inner container 110. The inner container 110 may be a pressure container for storing a liquid at a pressure higher than the atmospheric pressure. A multi-layer insulation material "M" may be provided outside the inner container 110 to prevent heat intrusion from the outside.

The outer container 120 may be a container that is disposed to surround the inner container 110 and forms a heat insulation space 121 between the inner container 110 and the outer container 120. The heat insulation space 121 may be a space for suppressing heat transfer from the outside of the outer container 120 to the inner container 110. The heat insulation space 121 may be maintained in a vacuum state. To this end, the outer container 120 may be a vacuum container.

The cryogenic container for a vehicle according to the present embodiment may be a cryogenic container in which the heat insulation space 121 is formed between the inner container 110 (an inner tank) and the outer container 120 (an outer tank) as described above, and thus the fluid "L" of the inner space 111 is prevented from being evaporated by the heat transfer from the outside.

Reinforcement Part 130

Figure 2:
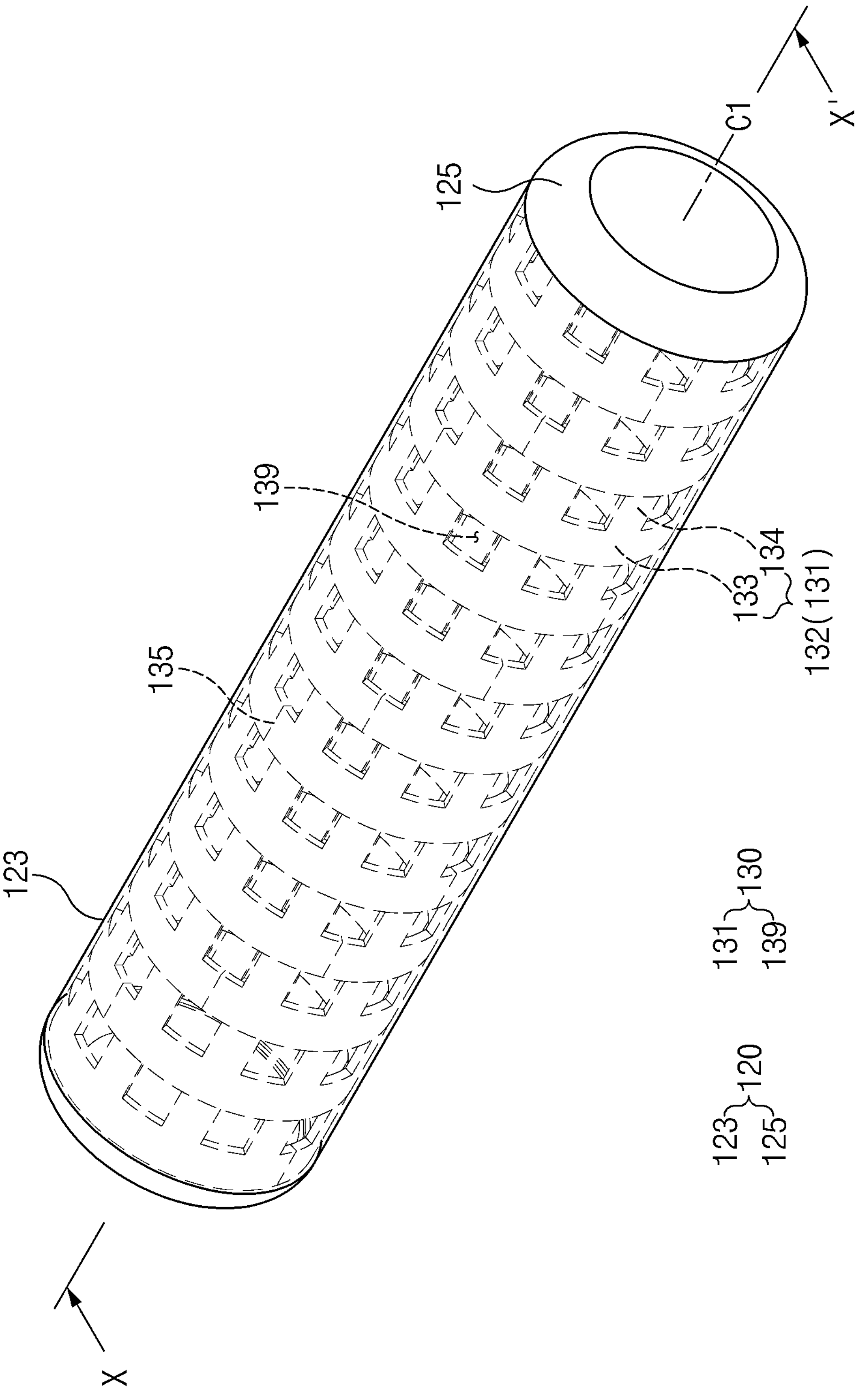
FIG. 2 is a perspective view illustrating an outer container to which a reinforcement part is applied according to the embodiment of the present disclosure.
Figure 3:
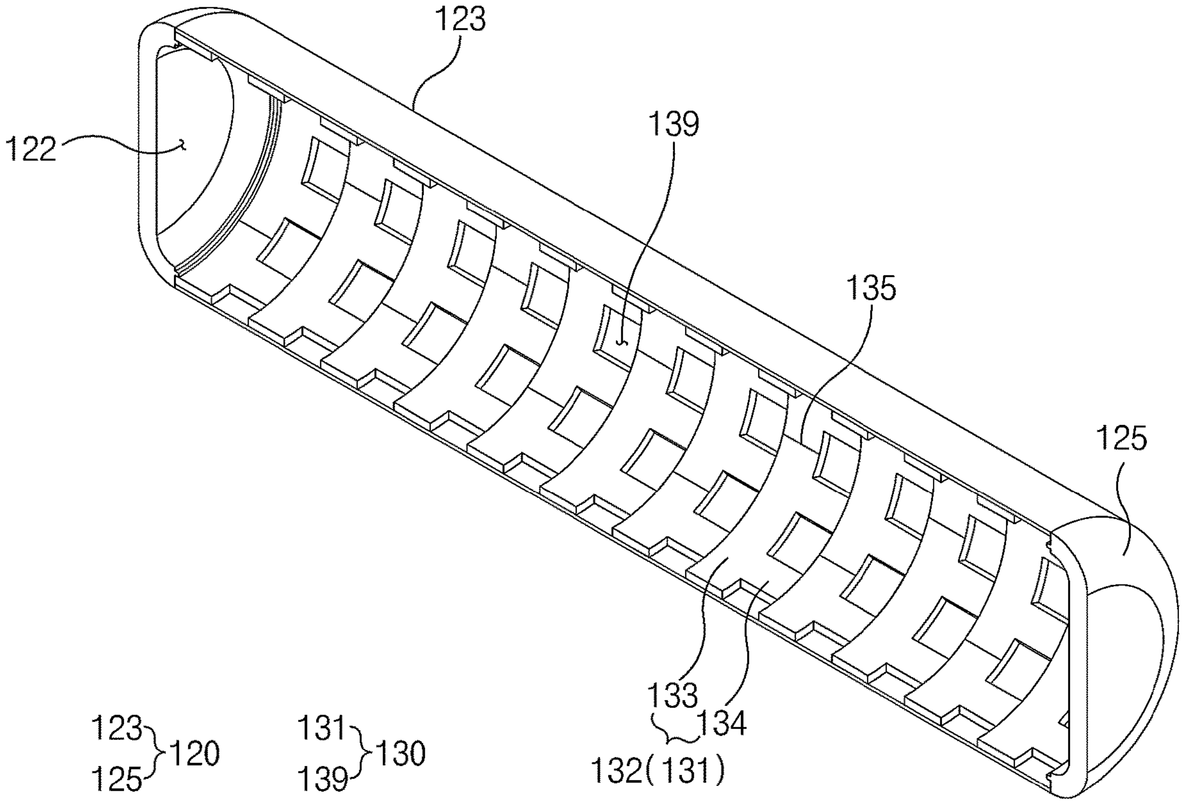
FIG. 3 is a partial cutaway perspective view of the container of FIG. 2 along line X-X' of FIG. 2.

To use the cryogenic container for a vehicle, the weight of the cryogenic container may be reduced even while the strength of the cryogenic container is maintained. To this end, it may be considered that the cryogenic container is reinforced by a separate member to reduce the weight (or thickness) of the cryogenic container and, at the same time, compensate for a decrease in the strength of the cryogenic container due to the reduction of the weight. For this purpose, as illustrated in FIGS. 2 and 3, the cryogenic container for a vehicle according to the present embodiment may include a reinforcement part 130 for reinforcing the outer container 120. FIG. 2 is a perspective view illustrating the outer container 120 to which the reinforcement part 130 is applied according to the embodiment of the present disclosure, and FIG. 3 is a partial cutaway perspective view of the container of FIG. 2 along line X-X' of FIG. 2.

The reinforcement part 130 may be disposed in the heat insulation space 121 (see FIG. 1) formed between the inner container 110 (see FIG. 1) and the outer container 120 and support the outer container 120 as illustrated in FIGS. 2 and 3. Since the reinforcement part 130 supports the outer container 120 from an inside of the outer container 120, the reinforcement part 130 is not exposed to the outside of the outer container 120 and may be thus applied to the outer container 120 receiving a force from the outside. Further, since the reinforcement part 130 is disposed in the heat insulation space 121 between the inner container 110 and the outer container 120, a separate space for installing the reinforcement part 130 is not required, and thus the reinforcement part 130 may be applied to the cryogenic container without increasing the entire size of the cryogenic container.

The reinforcement part 130 may include a reinforcement body 131 having an annular cross section corresponding to an inner circumferential surface of the outer container 120. For example, a cross section of the reinforcement body 131 defined in a plane perpendicular to a central axis C1 of the outer container 120 may have an annular shape corresponding to the inner circumferential surface of the outer container 120. An annular shape capable of supporting the inner circumferential surface of the outer container 120, which may be at least partially in contact with the inner circumferential surface of the outer container 120, may be considered as a shape corresponding to the inner circumferential surface of the outer container 120.

Since the reinforcement body 131 has an annular cross section and thus may be disposed in the heat insulation space 121 (see FIG. 1) to be in contact with the inner circumferential surface of the outer container 120, the reinforcement body 131 may support the outer container 120 from the inside of the outer container 120. Therefore, the reinforcement body 131 may compensate for the strength of the outer container 120. The reinforcement body 131 may be entirely or partially in contact with the inner circumferential surface of the outer container 120. As the contact area therebetween increases, the strength of the outer container 120 may be more effectively compensated for.

Because the reinforcement body 131 is formed in a simple annular shape, the cryogenic container according to the present embodiment may be manufactured easily and at a low cost, while also having the outer container 120 with improved strength. Further, because the reinforcement body 131 is formed in an annular shape that is not in contact with an outer circumferential surface of the inner container 110, the cryogenic container according to the present embodiment may prevent degradation of heat insulation performance while having the outer container 120 with the improved strength. When the reinforcement member provided between the outer container 120 and the inner container 110 physically connects these containers 110 and 120, the reinforcement member may serve as a bridge that transfers heat from the outer container 120 to the inner container 110. Accordingly, the heat insulation performance of the cryogenic container may be degraded.

In one embodiment, the reinforcement part 130 may include a plurality of through-holes 139 passing through the reinforcement body 131. For example, the through-hole 139 may be a hole passing through the reinforcement body 131 in a direction perpendicular to a central axis C2 (see FIG. 4) (which may be the same as the central axis C1 of the outer container) of the reinforcement body 131. The through-holes

139 may be arranged in a circumferential direction of the reinforcement body 131. When the through-holes 139 are formed, a weight of the reinforcement part 130 is reduced, which may be helpful to reduce the weight of the cryogenic container.

Body Unit 132

Figure 4:
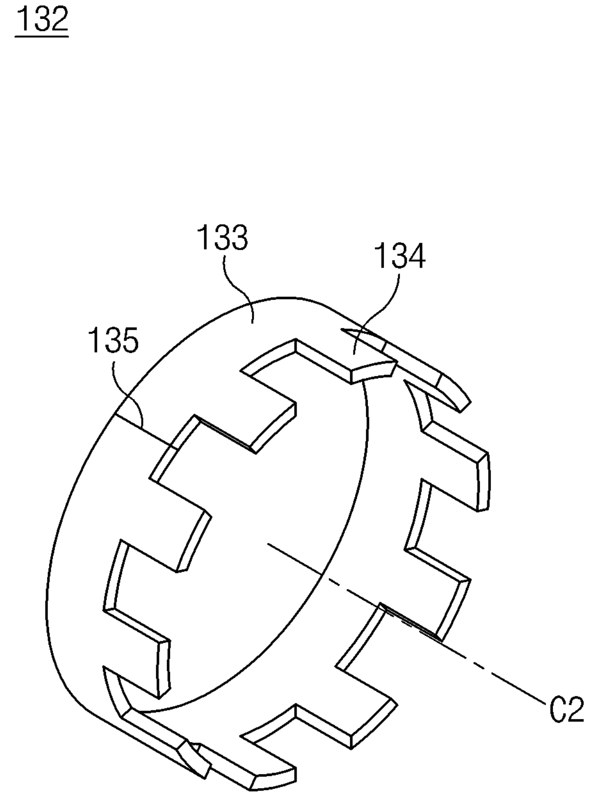
FIG. 4 is a perspective view illustrating a body unit of FIG. 2.

In more detail, the reinforcement body 131 may include a plurality of body units 132. As illustrated in FIG. 4, each of the body units 132 may include a support member 133 and a plurality of leg members 134. FIG. 4 is a perspective view illustrating the body unit 132 of FIG. 2.

The support member 133 may be a member that has an annular cross section, and thus may be inscribed on the inner circumferential surface of the outer container 120 (see FIGS. 2 and 3) and also inscribed on the inner circumferential surface of the outer container 120 to support the inner circumferential surface of the outer container 120. The leg member 134 may be a member extending from the support member 133 in a direction corresponding to a direction of the central axis C2 of the support member 133 (which may be the same as the central axis of the reinforcement body). The leg members 134 may be arranged spaced apart from each other in a circumferential direction of the support member 133. The body unit 132 may include the support member 133 and the leg members 134 and thus may have an annular cross section as a whole.

When the reinforcement part 130 is formed as a set of the body units 132, a manufacturing cost of the reinforcement part 130 may be reduced. When the body units 132 having a relatively small size and the same shape are manufactured, the size of a mold required for manufacturing the body units 132 may be reduced, and the production quantity of the body units 132 may also be increased. Further, since the reinforcement part 130 is easily installed, a manufacturing cost of the cryogenic container may be also reduced.

Figure 5:
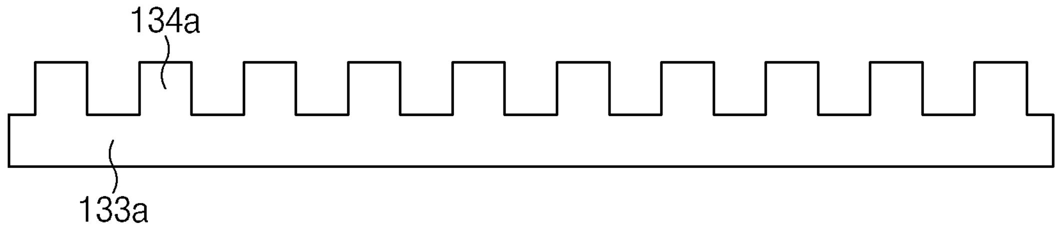
FIG. 5 is a view illustrating a material for manufacturing the body unit of FIG. 4.

The body unit 132 may be manufactured by rolling a material of FIG. 5 into an annular shape. FIG. 5 is a view illustrating a material for manufacturing the body unit 132 of FIG. 4. A process of manufacturing the body unit 132 is described below in more detail.

First, a flat material is processed into a shape illustrated in FIG. 5. To this end, press processing, laser cutting, or the like may be used. The material of FIG. 5 may include a first portion **133*a* extending in a predetermined direction (for example, a left-right direction of FIG. 5) and a plurality of second portions 134*a* extending from the first portion 133*a* in a direction (for example, a vertical direction of FIG. 5) perpendicular to the predetermined direction and arranged spaced apart from each other in the predetermined direction. The first portion 133*a* may correspond to the support member 133 of the body unit 132, and the second portions 134*a* may correspond to the leg members 134 of the body unit 132**.

Next, the first portion **133*a* is rolled into an annular shape. Accordingly, the body unit 132 of FIG. 4 may be manufactured. In this case, a cutting line 135 (see FIG. 4) that cuts the first portion 133*a* (that is, the support member 133) in a direction corresponding to the direction of the central axis C2 (see FIG. 4) may be formed in the body unit 132. The cutting line 135 may be formed, for example, as a left distal end and a right distal end of the first portion 133*a* of FIG. 5** come into contact with each other.

Next, adjacent portions (that is, the left distal end and the right distal end) of the first portion **133*a* are joined. Accordingly, the annular shape of the first portion 133*a* may be stably maintained. The joining may be performed by welding or bonding. Hereinafter, a case in which the joining is performed by the "welding" is representatively described as an example. The joining may be performed in the form of suturing the cutting line 135. Accordingly, the cutting line 135 may be changed into a suture line 135** (the same reference numeral is given because the suture line is substantially the same as the cutting line).

The body unit 132 may be manufactured in the above process. The welding may be selectively performed. When the welding is progressed, the suture line 135 may be formed in the body unit 132 (the support member 133), and when the welding is not progressed, the cutting line 135 may be formed in the body unit 132.

Figure 6:
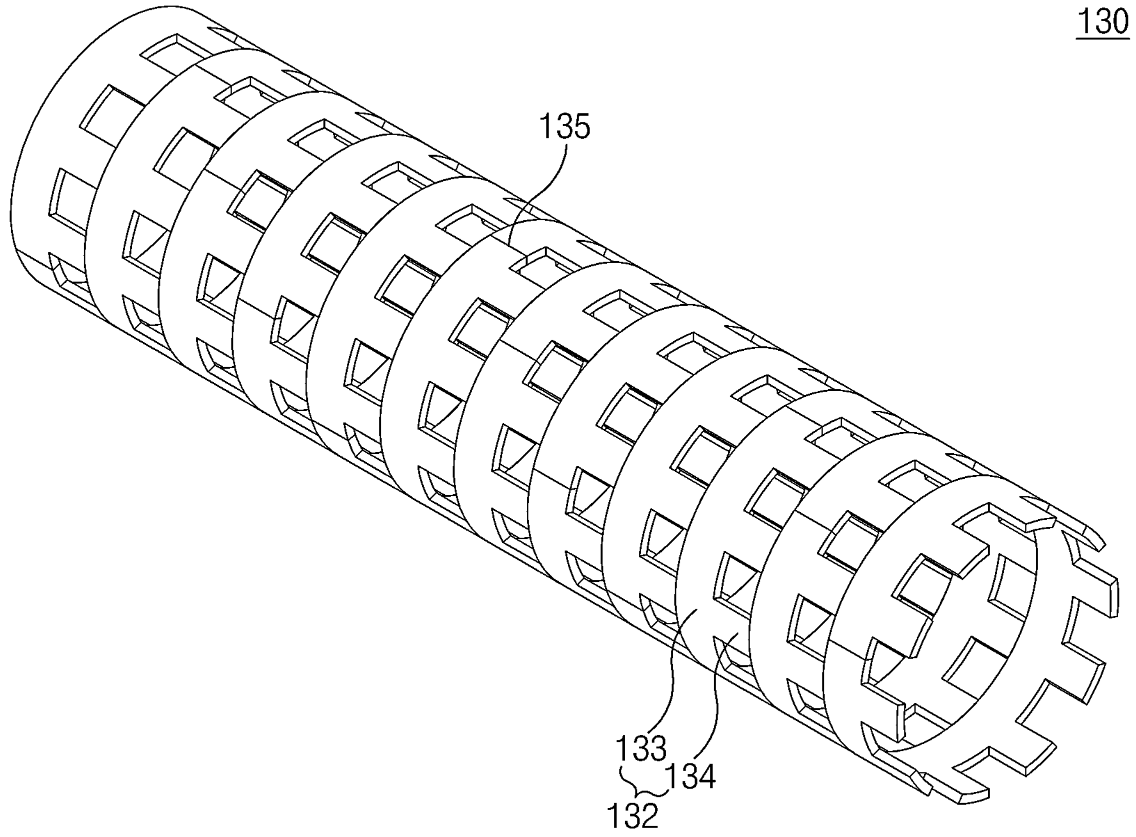
FIG. 6 is a perspective view illustrating a reinforcement part, in which body units are connected and provided, as the reinforcement part of FIG. 2.

The reinforcement part 130 of FIG. 6 may be formed when the body units 132 are sequentially connected in a direction of the central axis C2 (see FIG. 4). FIG. 6 is a perspective view illustrating the reinforcement part 130, in which the body units 132 are connected and provided, as the reinforcement part 130 of FIG. 2. The connection between the body units 132 may be implemented by coupling the body units 132 to each other through the welding or the like. Alternatively, the connection between the body units 132 may be implemented in a manner in which the body units 132 are sequentially inserted into an inner space 122 (see FIG. 3) of the outer container 120 without being physically combined to each other.

As illustrated in FIG. 6, the body units 132 may be arranged such that the support member 133 of one of the two adjacent body units 132 and the leg members 134 of the other one thereof are in contact with each other.

As illustrated in FIG. 6, the body units 132 may be arranged such that the cutting line 135 (or the suture line) of one of the two adjacent body units 132 is not positioned on a straight line with the cutting line 135 (or the suture line) of the other one thereof. In the body unit 132, the cutting line 135 (or the suture line) may be a relatively low-strength portion. As the cutting lines 135 (or the suture lines) of the body units 132 are alternately arranged with each other, a problem may be prevented in which low-strength portions are arranged on a straight line and thus the strength of the reinforcement part 130 is reduced.

Fixing of Reinforcement Part 130

Referring to FIGS. 2 and 3, the reinforcement part 130 may not physically combined to the inner circumferential surface of the outer container 120. For example, the reinforcement body 131 of the reinforcement part 130 may not be combined to the inner circumferential surface of the outer container 120. The physical coupling may be described as coupling that does not permit relative movement between two members. For example, it may be assumed that the two members are combined by welding or bonding or fastened by a bolt.

When the reinforcement part 130 is not physically combined to the outer container 120, a process of installing the reinforcement part 130 in the outer container 120 may be very easy. Further, when the reinforcement part 130 is physically combined to the outer container 120, for example, when the reinforcement part 130 is combined to the outer container 120 by welding, physical properties of the container (especially, mechanical properties obtained by heat treatment) may be degraded due to heat applied during the welding. However, when the reinforcement part 130 is not physically combined to the outer container 120, this problem may not occur.

Figure 7:
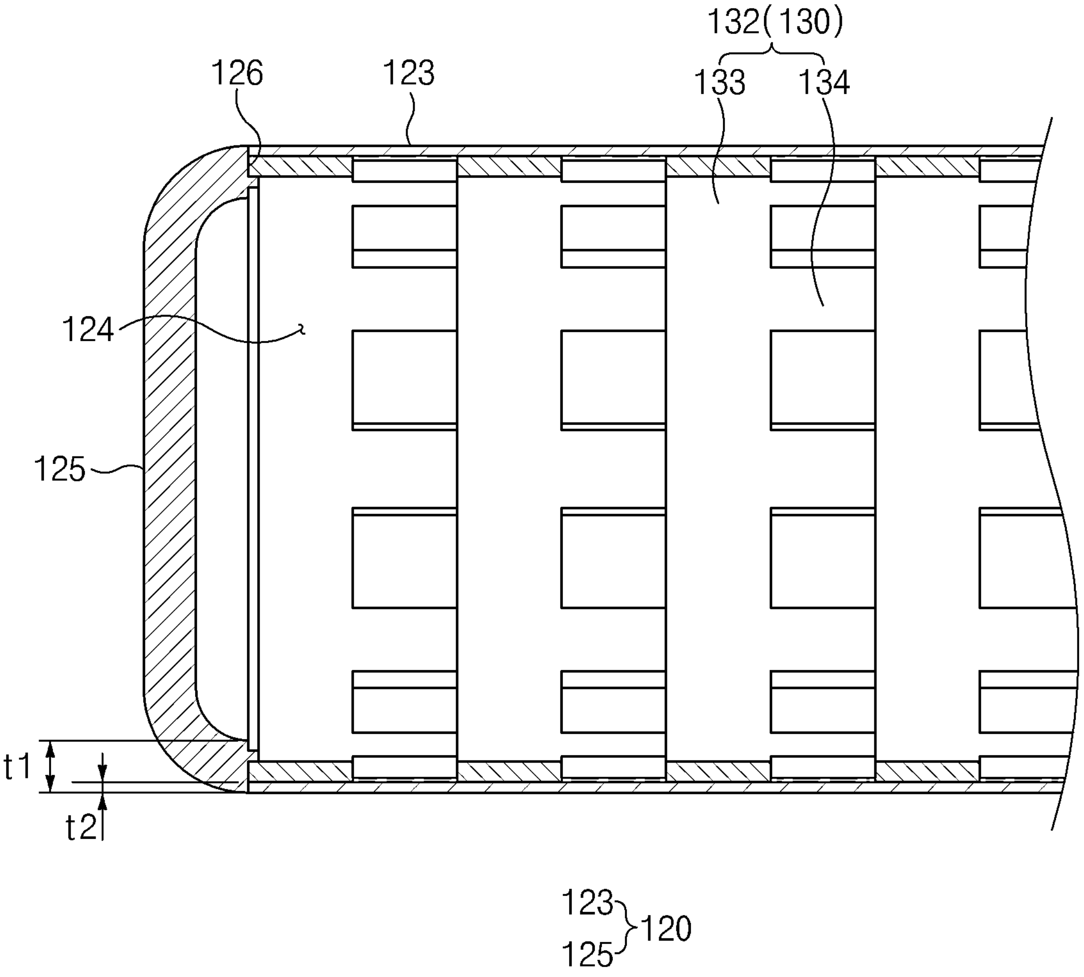
FIG. 7 is a cross-sectional view along line X-X' of FIG. 2.

As described below, the reinforcement part 130 according to one embodiment of the present embodiment may be fixed to the heat insulation space 121 (see FIG. 1) between the outer container 120 and the inner container 110 or the inner space 122 (see FIG. 3) of the outer container 120 even without physical coupling with the outer container 120. This embodiment is described below with reference to FIG. 7. FIG. 7 is a cross-sectional view along line X-X' of FIG. 2.

First, as illustrated in FIG. 2, the outer container 120 may include a cylinder portion 123 and a head portion 125. The cylinder portion 123 may be a portion having an annular cross section and extending in a predetermined longitudinal direction (see direction C1) perpendicular to the annular cross section. The head portion 125 may be a portion covering an opening of the cylinder portion 123. The head portion 125 may have a dish shape or a hemispherical shape. At least one of both ends of the cylinder portion 123 in a longitudinal direction may be open. FIG. 2 illustrates an example in which both ends of the cylinder portion 123 are open.

As illustrated in FIG. 7, the head portion 125 may be thicker than the cylinder portion 123 (see t1 and t2 in FIG. 7). Accordingly, an inner circumferential surface of the head portion 125 may protrude from a coupling position between the head portion 125 and the cylinder portion 123 further toward the heat insulation space 121 (see FIG. 1) than an inner circumferential surface of the cylinder portion 123. Due to this thickness difference, a portion 126 of a side surface of the head portion 125 may be exposed to the heat insulation space 121. The reinforcement part 130 may be supported by the exposed side surface 126 of the head portion 125 at a coupling position between the head portion 125 and the cylinder portion 123 and fixed to the heat insulation space 121. For example, after the plurality of body units 132 are sequentially inserted into an inner space 124 of the cylinder portion 123, while the head portion 125 is combined to an open one end of the cylinder portion 123, the outermost body unit 132 is pressed to the exposed side surface 126 of the head portion 125, and thus the body units 132 inside the outer container 120 may be fixed to the heat insulation space 121. Therefore, during the installation process of the reinforcement part 130, a physical coupling process (for example, the welding) may be minimized or eliminated.

Material of Cryogenic Container (Outer Container)

The cryogenic container according to the present embodiment may be a container that stores liquefied hydrogen and may thus be manufactured of a material suitable for storing hydrogen. For example, the container may be manufactured of stainless steel or aluminum. In particular, SUS 300 series stainless steel and 6000 series aluminum are known to be suitable for storing hydrogen. However, since these materials have low strength, the thickness of the container should be increased to secure a strength required for the cryogenic container. The increase in the thickness causes an increase in the manufacturing cost as well as increases in the weight and a volume.

This increase in the thickness may more significantly occur in the outer container 120. The outer container 120 is manufactured to withstand a relatively low pressure as compared to the inner container 110, but buckling may occur in the outer container 120. Thus, the outer container 120 should be manufactured such that the thickness of the outer container 120 is greater than a thickness at which a predetermined allowable pressure may be withstood, and further, the outer container 120 should be large enough to surround the inner container 110.

However, since the cryogenic container according to the present embodiment includes the reinforcement part 130 that reinforces the outer container 120, even when the outer container 120 is manufactured of at least one of SUS 300 series stainless steel, 1000 series aluminum, and 6000 series aluminum, the outer container 120 may be manufactured without increasing the thickness for securing the strength. For reference, a large container such as the outer container 120 is mainly manufactured by welding, and 1000 series aluminum and 6000 series aluminum have excellent welding performance. Thus, the cryogenic container according to the present embodiment may be usefully applied to the large container. For reference, the cryogenic container (the outer container) may be manufactured of stainless steel, aluminum, and other steel sheets for a pressure container. For example, the outer container 120 may be manufactured of SUS 300 series stainless steel, 1000 series aluminum, or 6000 series aluminum. The outer container 120 may be manufactured of SUS 300 series stainless steel or 6000 series aluminum that has no problem in hydrogen embrittlement.

Further, the reinforcement part 130 may be manufactured of at least one of steel, spring steel, titanium, titanium alloy, 2000 series aluminum, and 7000 series aluminum. These materials have high mechanical properties. The reinforcement part 130 may be disposed in the vacuum heat insulation space 121 provided between the inner container 110 and the outer container 120. Thus, even when a material is vulnerable to corrosion or the like, when the material has high strength, the material may be used as the material of the reinforcement part 130. Accordingly, the degree of freedom in selecting the material of the reinforcement part 130 may be high.

Method of Manufacturing Outer Container 120

The outer container according to the present embodiment may be manufactured as follows.

First, the cylinder portion 123 (see FIGS. 2 and 3) having at least one open end is prepared.

Next, the reinforcement part 130 for reinforcing the cylinder portion 123 is inserted into the inner space 122 (or see reference numeral 124 in FIG. 7) of the cylinder portion 123 through an opening of the cylinder portion 123. In this case, the reinforcement part 130 may be disposed in the inner space 122 of the cylinder portion 123 in a state of being in contact with the inner circumferential surface of the cylinder portion 123. Further, as described above, the reinforcement part 130 may include the plurality of body units 132. The insertion of the reinforcement part 130 may be progressed in a manner in which the body units 132 are sequentially inserted into the inner space 122 of the cylinder portion 123. For reference, the inner container 110 may be inserted into the outer container 120 through the opening of the cylinder portion 123 after the reinforcement part 130 is inserted and before the head portion 125 is combined as described below.

Next, the head portion 125 for covering the opening is combined to one end of the cylinder portion 123. In this case, as described above, the reinforcement part 130 may be fixed to the inner space 124 by being pressed by the side surface 126 (see FIG. 7) of the head portion 125 exposed to the inner space 124 of the cylinder portion 123 due to a thickness difference between the head portion 125 and the cylinder portion 123. For reference, when both distal ends of the cylinder portion 123 are open, the head portion 125 may be combined to an opening at one distal end thereof, the reinforcement part 130 and the inner container 110 may be then inserted through an opening at the other distal end thereof, and another head portion 125 may be combined to the opening at the other distal end thereof.

Meanwhile, the cylinder portion 123 may be prepared by rolling a flat plate-like material. In this case, a cutting line (not illustrated) that cuts the cylinder portion 123 in a longitudinal direction of the cylinder portion 123 may be formed between (rolled and adjacent) distal ends of the flat plate-like material. In the present manufacturing method, after the reinforcement part 130 is inserted into the inner space 124 of the cylinder portion 123, the cylinder portion 123 may be welded along a cut line (other joining methods such as bonding may be applied). In this way, when the reinforcement part 130 is inserted before the welding, friction between the reinforcement part 130 and the cylinder portion 123 is minimized, so that the reinforcement part 130 may be easily installed without a separate lubricant. This is because, when an external force is applied to the cylinder portion 123, the inner diameter of the cylinder portion 123 may increase due to the cut line.

Modifications of Reinforcement Part 130

Figure 8:
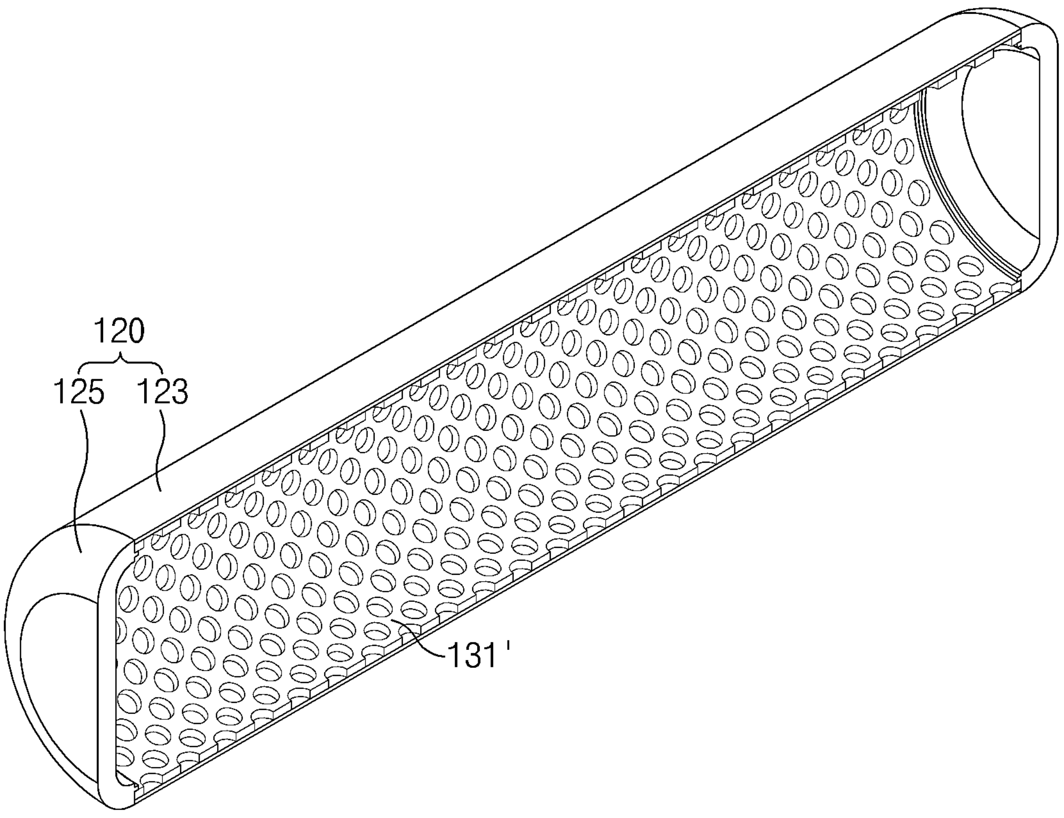
FIG. 8 is a partial cutaway perspective view illustrating a first modification of a reinforcement body according to an embodiment of the present disclosure.

The reinforcement body of the reinforcement part 130 may be modified as in the first modification of FIG. 8. FIG. 8 is a partial cutaway perspective view illustrating a first modification of a reinforcement body. As illustrated in FIG. 8, a reinforcement body 131' may be formed in a unitary one-piece structure. For example, the reinforcement body 131' may be formed in a single cylindrical body having an outer circumferential shape corresponding to the inner circumferential surface of the cylinder portion 123. Through-holes may be formed in the single body. The reinforcement body 131' may be provided to be distinguished from the outer container 120. For example, the reinforcement body 131' may be a separate object that is physically distinguished from the outer container 120. When the reinforcement body 131' is formed in a unitary one-piece structure, the reinforcement body 131' may be inserted into the outer container 120 at once, and thus an installation process of the reinforcement part 130 may be simplified.

Figure 9:
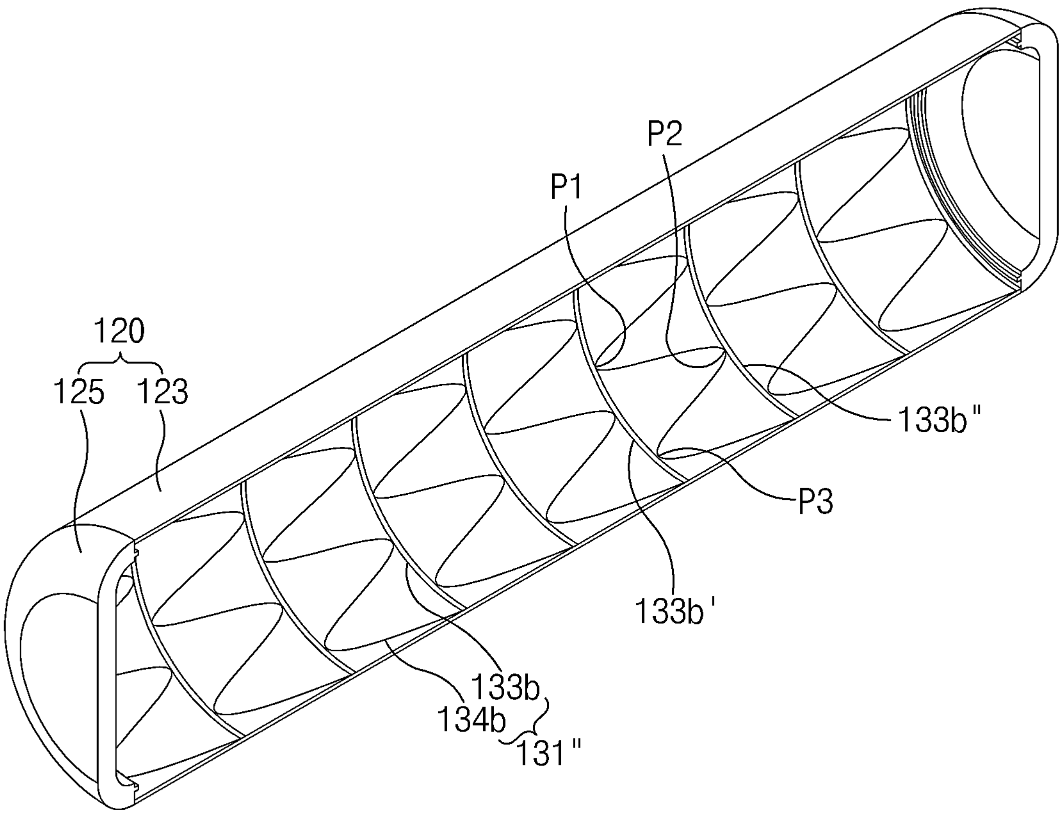
FIG. 9 is a partial cutaway perspective view illustrating a second modification of the reinforcement body according to an embodiment of the present disclosure.

The reinforcement body of the reinforcement part 130 may be modified as in the second modification of FIG. 9. FIG. 9 is a partial cutaway perspective view illustrating a second modification of the reinforcement body. As illustrated in FIG. 9, a reinforcement body 131" may include support rings **133*b* inscribed on the inner circumferential surface of the outer container 120 and connection strings 134*b* arranged between the two adjacent support rings 133*b* to connect the two adjacent support rings 133*b***.

The support rings **133*b* may serve to compensate for the strength of the outer container 120 by supporting the inner circumferential surface of the outer container 120, and the connection strings 134*b* may serve to elastically connect the support rings 133*b* so that a distance between the support rings 133*b*** is maintained.

The support rings **133*b* and the connection strings 134*b* may not be physically connected to each other. After the support rings 133*b* and the connection strings 134*b* are alternately inserted into the cylinder portion 123, in a process of coupling the head portion 125 to the cylinder portion 123, the support rings 133*b* and the connection strings 134*b* are pressed against the exposed side surface of the head portion 125, and thus the support rings 133*b* and the connection strings 134*b*** may be fixed.

The strings of the reinforcement body 131" may be manufactured of spring steel.

Since the reinforcement body 131" of FIG. 9 is formed as a string-shaped structure, manufacturing (molding) is easy and the weight may be reduced, and since a scrap is not generated in the manufacturing process, manufacturing costs may be reduced.

Meanwhile, the connection strings **134*b* may repeatedly connect the two adjacent support rings 133*b* in a circumferential direction of the support rings 133*b* in a manner in which one point P1 of a plurality of points on one support ring 133*b*' of the two adjacent support rings 133*b* and one point P2 of a plurality of points on the other one support ring 133*b*" of the two adjacent support rings 133*b* are connected, and then the one point P2 on the other one support ring 133*b*" is connected to another one point P3 on the one support ring 133*b*'**.

For example, the connection strings **134*b* may be formed in a sinusoidal shape and repeatedly connect the two adjacent support rings 133*b* in the circumferential direction of the support rings 133*b*. The sinusoidal shape of the connection strings 134*b* helps the elastic connection of the support rings 133*b***.

According to the present disclosure, since a reinforcement part that reinforces an outer container is provided, a strength of the outer container may be maintained or improved while achieving weight reduction of a cryogenic container through thinning the outer container, and a material suitable for storing hydrogen but having relatively low strength may be also used as a material for the container without increasing the thickness of the container.

Further, according to the present disclosure, since the reinforcement part is disposed in a heat insulation space between the outer container and an inner container, the outer container that receives an external force may be reinforced, and the weight reduction and high strength of the cryogenic container may be achieved without increasing a size of the cryogenic container.

Furthermore, according to the present disclosure, since the reinforcement part is easily manufactured and applied, the weight reduction and high strength of the cryogenic container may be achieved without increasing a manufacturing cost (or at a relatively low cost).

Furthermore, according to the present disclosure, since the reinforcement part may be installed in the outer container without welding, physical properties of the container may be prevented from being degraded due to heat applied during the welding.

The above description is merely illustrative of the technical spirit of the present disclosure, and those having ordinary skill in the art to which the present disclosure belongs may make various modifications and changes without departing from the features of the present disclosure. Thus, the embodiments disclosed in the present disclosure are not intended to limit the technology spirit of the present disclosure, but are intended to describe the present disclosure, and the scope of the technical spirit of the present disclosure is not limited by these embodiments. The scope of protection of the present disclosure should be interpreted by the appended claims, and all technical spirits within the scope equivalent thereto should be interpreted as being included in the scope of the present disclosure.

What is claimed is:

1. A cryogenic container for a vehicle for storing a fluid, the cryogenic container comprising:

an inner container forming an inner space for storing the fluid;

an outer container disposed to surround the inner container and forming a heat insulation space with the inner container, wherein the heat insulation space is configured to suppress heat transfer to the inner container, and the heat insulation space is formed between the inner container and the outer container; and a reinforcement part configured to support the outer container in the heat insulation space to reinforce the outer container, wherein the reinforcement part includes a reinforcement body having an annular cross section corresponding to an inner circumferential surface of the outer container and disposed in the heat insulation space to be in contact with the inner circumferential surface of the outer container, and wherein the reinforcement body includes:

a support member having an annular cross section and inscribed on the inner circumferential surface of the outer container to support the inner circumferential surface of the outer container, and a plurality of body units each having a plurality of leg members extending from the support member in a direction corresponding to a direction of a central axis of the support member and arranged spaced apart from each other in a circumferential direction of the support member.

2. The cryogenic container of claim 1, wherein the reinforcement part further includes a plurality of through-holes passing through the reinforcement body and arranged in a circumferential direction of the reinforcement body.

3. The cryogenic container of claim 1, wherein the reinforcement body is not physically combined to the inner circumferential surface of the outer container.

4. The cryogenic container of claim 1, wherein the plurality of body units are arranged such that the support member of one of two adjacent body units and the leg members of the other one thereof are in contact with each other.

5. The cryogenic container of claim 1, wherein each of the plurality of body units further includes a cutting line configured to cut the support member in a direction corresponding to the direction of the central axis or a suture line configured to suture the cutting line, and the plurality of body units are arranged such that the cutting line or suture line of one of two adjacent body units is not positioned on a straight line with the cutting line or suture line of the other one thereof.

6. The cryogenic container of claim 1, wherein the outer container includes a cylinder portion having an annular cross section and extending in a predetermined longitudinal direction perpendicular to the annular cross section, and a head portion configured to cover an opening of the cylinder portion, and the head portion is formed to be thicker than the cylinder portion and has an inner circumferential surface protruding from a coupling position between the head portion and the cylinder portion further toward the heat insulation space than an inner circumferential surface of the cylinder portion.

7. The cryogenic container of claim 6, wherein the reinforcement part is supported by a side surface of the head portion exposed to the heat insulation space and fixed to the heat insulation space due to a thickness difference between the head portion and the cylinder portion at the coupling position.

8. The cryogenic container of claim 1, wherein the outer container is formed of at least one of SUS 300 series stainless steel, 1000 series aluminum, and 6000 series aluminum.

9. The cryogenic container of claim 1, wherein the reinforcement part is formed of at least one of steel, spring steel, titanium, titanium alloy, 2000 series aluminum, and 7000 series aluminum.

10. A method of manufacturing an outer container of a cryogenic container for a vehicle for manufacturing an outer container disposed to surround an inner container storing a fluid, the method comprising:

preparing a cylinder portion having an opening at at least one end;

inserting a reinforcement part configured to reinforce the cylinder portion into an inner space of the cylinder portion through the opening; and coupling a head portion configured to cover the opening to one end of the cylinder portion, wherein the reinforcement part is disposed in the inner space of the cylinder portion while in contact with an inner circumferential surface of the cylinder portion, wherein the reinforcement part includes a support member having an annular cross section and configured to support the inner circumferential surface of the cylinder portion, and a plurality of body units each having a plurality of leg members extending from the support member in a direction corresponding to a longitudinal direction of the cylinder portion and arranged spaced apart from each other in a circumferential direction of the support member, and wherein inserting the reinforcement part includes sequentially inserting the body units into the inner space of the cylinder.

11. The method of claim 10, further comprising, between inserting the reinforcement part and coupling the head portion, joining the cylinder portion along a line cutting the cylinder portion in a longitudinal direction of the cylinder portion.

12. The method of claim 10, wherein the head portion is formed to be thicker than the cylinder portion and has an inner circumferential surface protruding from a coupling position between the head portion and the cylinder portion further toward the inner space than the inner circumferential surface of the cylinder portion, and in coupling the head portion, the reinforcement part is pressed by a side surface of the head portion exposed to the inner space and fixed to the inner space due to a thickness difference between the head portion and the cylinder portion at the coupling position when the head portion is combined to the cylinder portion.

13. The method of claim 10, wherein each of the body units is manufactured through:

processing a flat material to form a first portion extending in a predetermined direction and a plurality of second portions extending from the first portion in a direction perpendicular to the predetermined direction and arranged spaced apart from each other in the predetermined direction; and joining adjacent distal ends of the first portion after rolling the first portion into an annular shape.

* * * * *